United States Patent
Sakata et al.

(10) Patent No.: US 9,538,219 B2
(45) Date of Patent: Jan. 3, 2017

(54) DEGREE OF INTEREST ESTIMATING DEVICE AND DEGREE OF INTEREST ESTIMATING METHOD

(75) Inventors: Kotaro Sakata, Hyogo (JP); Shigenori Maeda, Kyota (JP); Ryo Yonetani, Kyoto (JP); Hiroaki Kawashima, Kyota (JP); Takatsugu Hirayama, Aichi (JP); Takashi Matsuyama, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 13/701,540

(22) PCT Filed: Jan. 26, 2012

(86) PCT No.: PCT/JP2012/000508
§ 371 (c)(1),
(2), (4) Date: Dec. 3, 2012

(87) PCT Pub. No.: WO2012/105196
PCT Pub. Date: Aug. 9, 2012

(65) Prior Publication Data
US 2013/0091515 A1  Apr. 11, 2013

(30) Foreign Application Priority Data
Feb. 4, 2011  (JP) ................. 2011-023271

(51) Int. Cl.
*H04H 60/33* (2008.01)
*H04N 21/258* (2011.01)
(Continued)

(52) U.S. Cl.
CPC ............ *H04N 21/258* (2013.01); *H04N 17/04* (2013.01); *H04N 21/23439* (2013.01);
(Continued)

(58) Field of Classification Search
CPC ............... H04N 21/4312; H04N 21/44218; H04N 21/45455; H04N 21/4667; H04N 21/4668; H04N 21/4725; H04N 21/4728; H04N 21/858; H04N 21/8583; H04N 21/258; H04N 21/23439; H04N 21/25891; H04N 21/4223; H04N 21/44008; H04N 21/44213; H04N 17/04
(Continued)

(56) References Cited

U.S. PATENT DOCUMENTS 4,789,235 A * 12/1988 Borah ................ A61B 3/113
351/210
5,886,683 A * 3/1999 Tognazzini ............ G06F 3/013
345/156
(Continued)

FOREIGN PATENT DOCUMENTS

JP  2006-020131  1/2006
JP  2009-247753  10/2009
WO  2010/070882  6/2010

OTHER PUBLICATIONS

International Search Report issued Apr. 17, 2012 in International (PCT) Application No. PCT/JP2012/000508.
(Continued)

*Primary Examiner* — An Son P Huynh
(74) *Attorney, Agent, or Firm* — Wenderoth, Lind & Ponack, L.L.P.

(57) ABSTRACT

An interest degree estimating device, which estimates a degree of interest of a user in a video displayed on a screen, includes: an eye gaze detecting unit for detecting an eye gaze direction of the user; a saliency information obtaining unit for obtaining saliency information on a saliency area having salient attractiveness in the video; and a user response analyzing unit for calculating a correlation between the saliency area specified from the obtained saliency informa-
(Continued)

tion and the detected eye gaze direction, and estimate the degree of interest of the user in the video, the degree of interest being higher as the calculated correlation is higher.

20 Claims, 14 Drawing Sheets

(51) Int. Cl.
H04N 17/04 (2006.01)
H04N 21/2343 (2011.01)
H04N 21/4223 (2011.01)
H04N 21/44 (2011.01)
H04N 21/442 (2011.01)

(52) U.S. Cl.
CPC ... *H04N 21/25891* (2013.01); *H04N 21/4223* (2013.01); *H04N 21/44008* (2013.01); *H04N 21/44213* (2013.01)

(58) Field of Classification Search
USPC .............................................. 725/10, 34, 46
See application file for complete search history.

(56) References Cited

U.S. PATENT DOCUMENTS

| | | | |
|---|---|---|---|
| 7,120,880 B1 | 10/2006 | Dryer et al. | |
| 8,044,808 B2 | 10/2011 | Koshizen et al. | |
| 8,079,054 B1* | 12/2011 | Dhawan | G06Q 30/00 705/14.4 |
| 8,830,164 B2* | 9/2014 | Sakata | G06F 3/013 345/156 |
| 2004/0080670 A1* | 4/2004 | Cheatle | H04N 1/3872 348/441 |
| 2004/0088726 A1* | 5/2004 | Ma | G06K 9/00711 725/46 |
| 2004/0101212 A1* | 5/2004 | Fedorovskaya | G06F 17/30265 382/305 |
| 2005/0108092 A1* | 5/2005 | Campbell | A61B 3/113 705/14.64 |
| 2006/0048189 A1* | 3/2006 | Park et al. | 725/46 |
| 2006/0248569 A1* | 11/2006 | Lienhart | H04N 5/76 725/135 |
| 2006/0256134 A1* | 11/2006 | Widdowson | G06T 11/60 345/629 |
| 2007/0019889 A1* | 1/2007 | Peter Miller | G06F 3/04842 382/305 |
| 2007/0101269 A1* | 5/2007 | Hua et al. | 715/723 |
| 2007/0104369 A1* | 5/2007 | Weatherhead | H04H 60/45 382/181 |
| 2007/0157260 A1* | 7/2007 | Walker | H04N 7/163 725/86 |
| 2008/0036875 A1* | 2/2008 | Jones | H04N 5/23238 348/222.1 |
| 2008/0260347 A1* | 10/2008 | Widdowson | G11B 27/034 386/278 |
| 2009/0003712 A1* | 1/2009 | Mei | G06F 17/30843 382/225 |
| 2009/0187933 A1* | 7/2009 | Ritter | G06F 3/013 725/12 |
| 2009/0262973 A1 | 10/2009 | Koshizen et al. | |
| 2009/0273711 A1* | 11/2009 | Chapdelaine | G06K 9/00711 348/465 |
| 2010/0161409 A1* | 6/2010 | Ryu | G06Q 30/02 705/14.43 |
| 2010/0169905 A1* | 7/2010 | Fukuchi et al. | 725/10 |
| 2010/0186031 A1* | 7/2010 | Pradeep et al. | 725/34 |
| 2010/0205541 A1* | 8/2010 | Rapaport et al. | 715/753 |
| 2010/0208205 A1* | 8/2010 | Tseng | A61B 3/113 351/209 |
| 2010/0226564 A1* | 9/2010 | Marchesotti | G06F 17/30256 382/159 |
| 2010/0238313 A1* | 9/2010 | Ohki | G06T 3/40 348/222.1 |
| 2010/0290705 A1* | 11/2010 | Nakamura | G06T 11/60 382/173 |
| 2011/0050656 A1* | 3/2011 | Sakata | G06F 3/011 345/204 |
| 2011/0112890 A1* | 5/2011 | Chu | G06Q 30/02 705/7.33 |
| 2011/0298702 A1* | 12/2011 | Sakata | G06F 3/013 345/156 |
| 2012/0154557 A1* | 6/2012 | Perez | H04N 21/25891 348/53 |
| 2013/0021373 A1* | 1/2013 | Vaught et al. | 345/633 |
| 2013/0050268 A1* | 2/2013 | Lohrenz et al. | 345/660 |
| 2013/0342539 A1* | 12/2013 | Khan | G06T 11/00 345/440 |

OTHER PUBLICATIONS

Laurent Itti et al., "Computational Modelling of Visual Attention", Nature Reviews Neuroscience, vol. 2, No. 3, Feb. 2001, p. 194-203.
Office Action and Search Report issued Dec. 2, 2015 in Chinese Application No. 201280001532.6, with partial English translation.

* cited by examiner

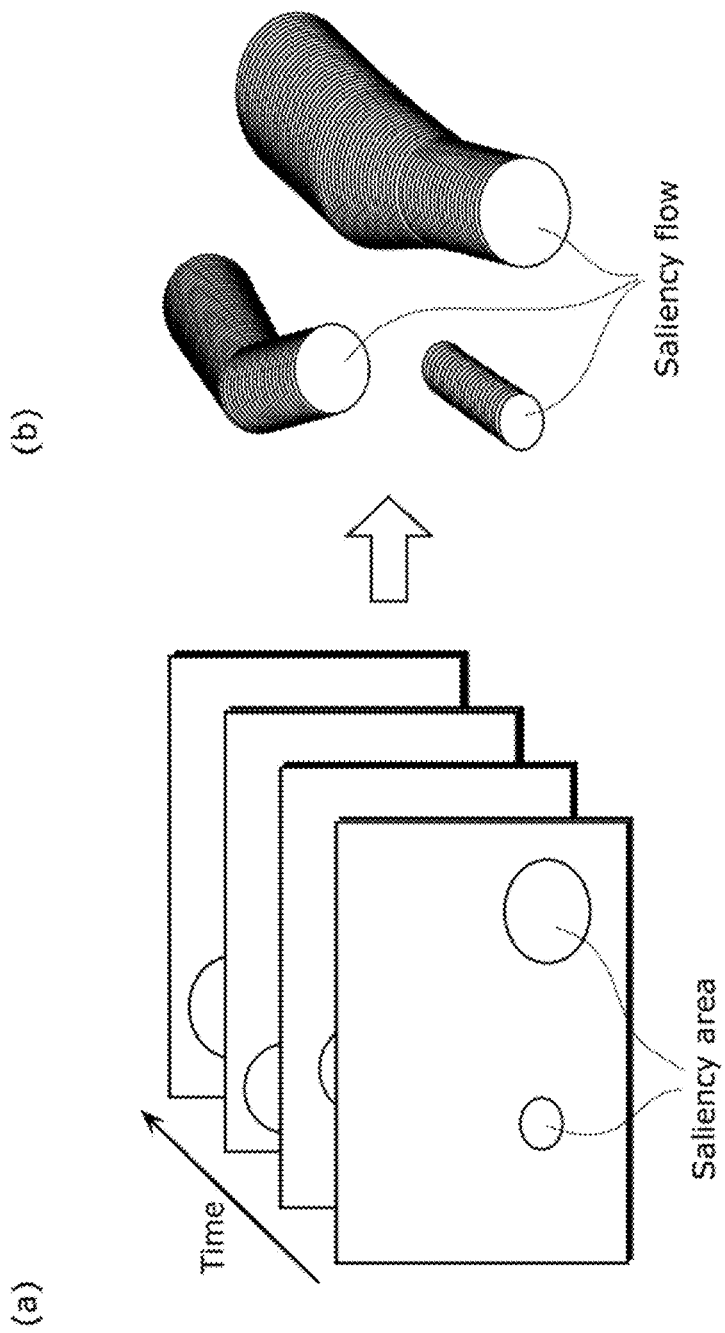

FIG. 10

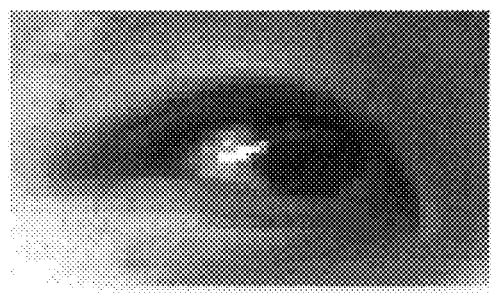

FIG. 11

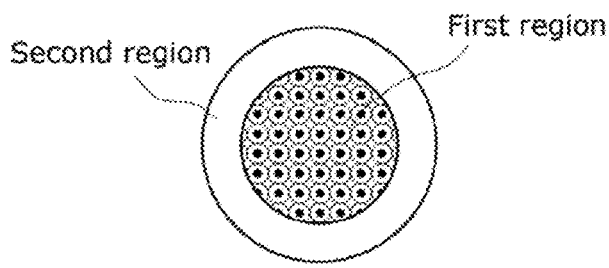

FIG. 12

| Eye gaze movement | Element |
|---|---|
| Action to obtain information from moving object (PA) | PA → P({NS \| XS}P)∗ |
| Action to obtain information from static object (FA) | FA → F({NS \| XS}F)∗ |
| Intentional object-changing action (NC) | NC → NS |
| Exogenous object-changing action (XC) | XC → XS |

P : Smooth eye pursuit (Pursuit)
F : Fixation (Fixation)
NS : Endogenous saccade (eNdogenous Saccade)
XS : Exogenous saccade (eXogenous Saccade)

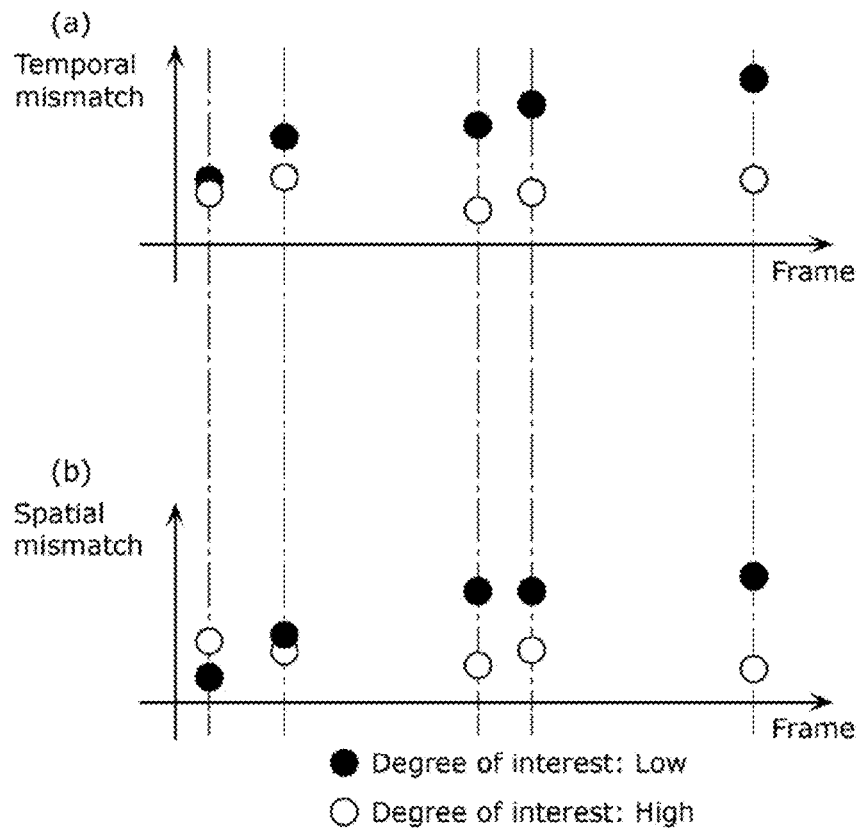

DEGREE OF INTEREST ESTIMATING DEVICE AND DEGREE OF INTEREST ESTIMATING METHOD

TECHNICAL FIELD

The present invention relates to a degree of interest estimating device and a degree of interest estimating method for estimating a degree of interest of a viewer (hereinafter also referred to as "user") watching a displayed video.

BACKGROUND ART

In this day and age of the information explosion with abundant information, people's interests have become diverse. Consequently, it is getting more and more difficult to win the hears and minds of users with conventional and uniform techniques for presenting information. Thus required today is a technique to present personalized information; that is, casually conveyed information of the users' potential interests.

For example, the number of channels for a TV as a display device is rapidly increasing along with the digitalization of the recent TV broadcasting. So is the number of content items distributed via the Internet. As a result, a user can select a content item from among a large number of content items. However, it is very difficult for the user himself or herself to select his or her favorite content item from among a large number of content items. To overcome the difficulty, actively studied is a system to recommend programs which suit the user's interests.

In order to present content items which suit the interests of the user, content providers need to understand how much the user is interested in each of the content items that he or she views on a regular basis. In other words, the content providers need to estimate a degree of interest of the user in a viewed video.

Patent Literature 1 describes one of conventional techniques to estimate a degree of interest. The technique in Patent Literature 1 involves checking a user's viewing status of a content item and eye movement to analyze his or her eye blink frequency, response time, saccade speed, saccade duration, and a positional deviation of his or her eye gaze. Then, using each of the analysis results as a computational element, the technique involves calculating a degree of interest of the viewer in the content item. Furthermore, based on the calculation result and another calculation result held in a data holding device, the technique involves calculating a degree of interest of the viewer in a specific content item.

CITATION LIST

Patent Literature

[PTL 1]
Patent Literature Japanese Unexamined Patent Application Publication No. 2006-20131

SUMMARY OF INVENTION

Technical Problem

The technique described in Patent Literature 1, however, merely estimates a degree of interest using, as a feature amount, the blink frequency of the user when the user is viewing a video. Thus, depending on how the video is organized, the technique cannot accurately estimate the degree of interest of the viewer.

The present invention is conceived in view of the above problem, and has an object to accurately estimate a degree of interest of a viewer in a video shown on a screen.

Solution to Problem

In order to achieve the above object, a degree of interest estimating device according to an aspect of the present invention estimates degree of interest of a user in a video displayed on a screen. The degree of interest estimating device includes: an eye gaze detecting unit which detects an eye gaze direction of the user; a saliency information obtaining unit which obtains saliency information on a saliency area having salient attractiveness in the video; and a user response analyzing unit which calculates a correlation between the saliency area specified from the obtained saliency information and the detected eye gaze direction, and estimates the degree of interest of the user in the video, the degree of interest being higher as the calculated correlation is higher.

Moreover, in order to achieve the above object, a degree of interest estimating method according to an aspect of the present invention is used to estimate a degree of interest of a user in a video displayed on a screen. The degree of interest estimating method includes: detecting an eye gaze direction of the user; obtaining saliency information on a saliency area having salient attractiveness in the video; calculating a correlation between the saliency area specified from the obtained saliency information and the detected eye gaze direction; and estimating the degree of interest of the user in the video, the degree of interest being higher as the calculated correlation is higher.

Advantageous Effects of Invention

The present invention can accurately estimate a degree of interest of a viewer in a video shown on a screen.

BRIEF DESCRIPTION OF DRAWINGS

FIG. 3 depicts a conceptual diagram showing a saliency structure according to the embodiment of the present invention.

FIG. 10 depicts a diagram showing detection of the center of the black part of an eye according to the embodiment of the present invention.

FIG. 11 depicts a diagram showing detection of the center of the black part of an eye according to the embodiment of the present invention.

FIG. 12 shows eye gaze movements and elements of the radial motions according to the embodiment of the present invention.

FIG. 13 shows a relationship between a saliency shift and a gaze response according to the embodiment of the present invention.

FIG. 14 shows evaluation criteria each associated with one of the saliency patterns according to the embodiment of the present invention.

DESCRIPTION OF EMBODIMENT

Figure 1:
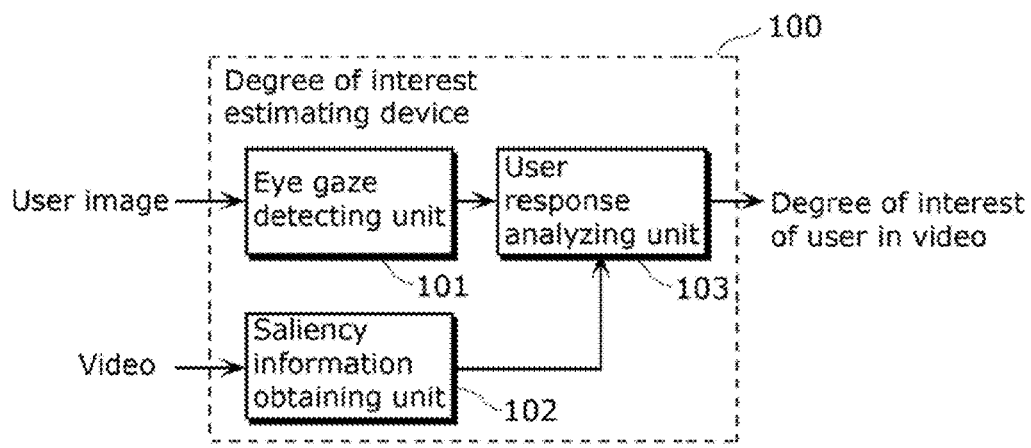
FIG. 1 depicts a block diagram showing a functional structure of a degree of interest estimating device according to an embodiment of the present invention.

Typically, a video producer intends to give some impressions to viewers through a specific person or object in a video. Thus the video producer tries to set an area on a screen, hoping that the area attracts the viewers' attention. In other words, the video producer often produces a video including an area (hereinafter referred to as "saliency area") whose attractiveness (attractiveness of visual attention) is salient.

When the video is a drama, for example, the video producer produces the video so that the saliency area displays the featured actor. When the video is an advertisement, the video producer produces the video so that the saliency area displays the advertised commodity.

Hence, when a viewer pays visual attention to the area set by the video producer who intends to attract the viewer's attention to the area, the viewer is taking the exact action of the video producer's intention. In other words, when the viewer pays visual attention to a saliency area in the video, the video producer can estimate a high degree of interest of the user in the video.

Hence a degree of interest estimating device according to an implementation of the present invention estimates degree of interest of a user in a video displayed on a screen. The degree of interest estimating device includes: an eye gaze detecting unit which detects an eye gaze direction of the user; a saliency information obtaining unit which obtains saliency information on a saliency area having salient attractiveness in the video; and a user response analyzing unit which calculates a correlation between the saliency area specified from the obtained saliency information and the detected eye gaze direction, and estimates the degree of interest of the user in the video, the degree of interest being higher as the calculated correlation is higher.

Such a structure allows the degree of interest estimating device to estimate a degree of interest of the user in a video based on a correlation between a saliency area in the video and the eye gaze direction of the user. Specifically, the degree of interest estimating device can estimate a degree of interest based on the characteristics of the video, which contributes to estimating the degree of interest with higher accuracy than when the degree of interest is estimated based only on the eye gaze direction. In particular, the degree of interest estimating device can take advantage of a feature that a higher correlation between a saliency area and an eye gaze direction provides a higher degree of interest in the video. Thus the degree of interest estimating device can estimate the degree of interest with higher accuracy.

In an interest degree estimating device according to another implementation of the present invention, each of saliency patterns may be (i) classified based on at least one of the number and a motion of saliency areas including the saliency area, and (ii) previously associated with at least one of evaluation criteria for evaluating a degree of a correlation, and the user response analyzing unit may calculate the correlation according to at least one of the evaluation criteria associated with one of the saliency patterns, which is specified from the saliency information.

Such a feature allows the degree of interest estimating device to calculate a correlation between the saliency area and the eye gaze direction according to an evaluation criterion which suits a saliency pattern. Hence the degree of interest estimating device can estimate a degree of interest with higher accuracy.

In an interest degree estimating device according to another implementation of the present invention, the saliency patterns may include a static pattern which shows that the saliency area does not change in position, the static pattern may be associated with, as the at least one of the evaluation criteria, occurrence frequency of saccades in the saliency area, and when the one saliency pattern specified from the saliency information is the static pattern, the user response analyzing unit may calculate the correlation so that the correlation is higher as the occurrence frequency of the saccades, specified from the detected eye gaze direction and found in the saliency area, is higher.

Such a feature makes it possible to calculate a correlation based on how many saccades occur in the saliency area, when the saliency pattern is a static pattern. The saccades in a saliency area are eye gaze movements to obtain information from the saliency area. Hence the feature makes it possible to calculate a correlation between the saliency area and the eye gaze direction so that the correlation is higher as more saccades occur within the saliency area, which contributes to successfully estimating a degree of interest with higher accuracy.

In a degree of interest estimating device according to another implementation of the present invention, the saliency information obtaining unit may obtain the saliency information from a tag attached to a signal showing the video.

Such a feature makes it possible to easily obtain the saliency information from a tag.

In a degree of interest estimating device according to another implementation of the present invention, the saliency information obtaining unit may obtain the saliency information by analyzing the video based on physical characteristics of an image.

Such a feature makes it possible to obtain the saliency information through an analysis of the video. Consequently, even though the saliency information of a provided video is unknown, the feature makes it possible to obtain the saliency information of the video, and accurately estimate a degree of interest in the video.

In a degree of interest estimating device according to another implementation of the present invention, the saliency area may be an area for an object which relates to audio information that comes with the video.

According to the feature, the saliency area is an area having a great relationship of the user with a degree of interest, which contributes to accurately estimating the degree of interest.

In a degree of interest estimating device according to another implementation of the present invention, the object may be a face or a mouth of a speaker.

According to the feature, the saliency area is an area having a great relationship of the user with a degree of interest, which contributes to accurately estimating the degree of interest.

In a degree of interest estimating device according to another implementation of the present invention, the saliency area is an area that shows a text message corresponding to the audio information.

According to the feature, the saliency area is an area having a great relationship of the user with a degree of interest, which contributes to accurately estimating the degree of interest.

In a degree of interest estimating device according to another implementation of the present invention, the saliency area may be an area of a moving object.

According to the feature, the saliency area is an area having a great relationship of the user with a degree of interest, which contributes to accurately estimating the degree of interest.

In a degree of interest estimating device according to another implementation of the present invention, the moving object may be a person.

According to the feature, the saliency area is an area having a great relationship of the user with a degree of interest, which contributes to accurately estimating the degree of interest.

In a degree of interest estimating device according to another implementation of the present invention, the moving object may be an animal.

According to the feature, the saliency area is an area having a great relationship of the user with a degree of interest, which contributes to accurately estimating the degree of interest.

In a degree of interest estimating device according to another implementation of the present invention, the correlation may be a degree of temporal synchronization between the saliency area and the detected eye gaze direction.

According to the feature, the correlation may be calculated as a degree of temporal synchronization between the saliency area and the detected eye gaze direction, which contributes to accurately estimating a degree of interest.

In a degree of interest estimating device according to another implementation of the present invention, the correlation may be a degree of spatial similarity between the saliency area and the detected eye gaze direction.

According to the feature, the correlation may be calculated as a degree of spatial similarity between the saliency area and the detected eye gaze direction, which contributes to accurately estimating a degree of interest.

In a degree of interest estimating device according to another implementation of the present invention, the user response analyzing unit may calculate, as a value showing how low the correlation is, a time difference between a time when the saliency area appears and a time when a saccade of an eye gaze for the saliency area occurs; and estimate the degree of interest so that the degree of interest is higher as the time difference is smaller.

Such a feature makes it possible to calculate a time difference between appearing timing of a saliency area and occurring timing of a saccade to the saliency area as a value showing how low the correlation is between the saliency area and the eye gaze direction. Consequently, the feature makes it possible to calculate the correlation more appropriately, which contributes to accurately estimating a degree of interest.

In a degree of interest estimating device according to another implementation of the present invention, the user response analyzing unit may: calculate, as a value showing how low the correlation is, a time difference between a time when the saliency area moves on the screen at a predetermined speed or faster and a time when a saccade of an eye gaze at the saliency area occurs; and estimate the degree of interest so that the degree of interest is higher as the time difference is smaller.

Such a feature makes it possible to calculate a time difference between moving timing of a saliency area and occurring timing of a saccade to the saliency area as a value showing how low the correlation is between the saliency area and the eye gaze direction. Consequently, the feature makes it possible to calculate the correlation more appropriately, which contributes to accurately estimating a degree of interest.

In a degree of interest estimating device according to another implementation of the present invention, the user response analyzing unit may: calculate, as a value showing how low the correlation is, a speed difference between a moving speed of the saliency area on the screen and a moving speed of a gaze position, on the screen, specified from the eye gaze direction; and estimate the degree of interest so that the degree of interest is higher as the speed difference is smaller.

Such a feature makes it possible to calculate a speed difference between the motion speed of a saliency area and the motion speed of a gaze position as a value showing how low the correlation is between the saliency area and the eye gaze direction. Consequently, the feature makes it possible to calculate the correlation more appropriately, which contributes to accurately estimating a degree of interest.

In a degree of interest estimating device according to another implementation of the present invention, the user response analyzing unit may calculate the correlation based on the number of saliency areas in the video, an area of each of the saliency areas, and occurrence frequency of saccades of an eye gaze.

Such a feature makes it possible to appropriately calculate a correlation based on the number of saliency areas in a video, the area of each of the saliency areas, and the occurrence frequency of saccades of the eye gaze.

A degree of interest estimating device according to another implementation of the present invention may be configured as an integrated circuit.

A degree of interest estimating method according to another implementation of the present invention is used for estimating a degree of interest of a user in a video displayed on a screen. The method includes: detecting an eye gaze direction of the user; obtaining saliency information on a saliency area having salient attractiveness in the video; calculating a correlation between the saliency area specified from the obtained saliency information and the detected eye gaze direction; and estimating the degree of interest of the user in the video, the degree of interest being higher as the calculated correlation is higher.

Such features make it possible to obtain the same advantageous effects as those of the degree of interest estimating device.

It is noted that the present invention can also be implemented as a program causing a computer to execute the respective steps included in the degree of interest estimating method. As a matter of course, such a program may be distributed via a non-transitory recording medium such as a compact disc read only memory (CD-ROM), and a transmission medium such as the Internet.

Hereinafter, an embodiment of the present invention is described with reference to the drawings. It is noted that the embodiment below is a specific and preferable example of the present invention. The numerical values, shapes, materials, constitutional elements, arrangement positions and connecting schemes of the constitutional elements, steps, and an order of steps all described in the embodiment are examples, and shall not be defined as they are. The present invention shall be defined only by claims. Hence, among the constitutional elements in the embodiment, those not described in an independent claim representing the most generic concept of the present invention are not necessarily required to achieve the objects of the present invention; however, such constitutional elements are introduced to implement a preferable form of the present invention.

Embodiment

FIG. 1 depicts a block diagram showing a functional structure of a degree of interest estimating device according to an embodiment of the present invention.

A degree of interest estimating device 100 estimates a degree of interest of a user (viewer) in a video shown on a screen.

As shown in FIG. 1, the degree of interest estimating device 100 includes an eye gaze detecting unit 101, a saliency information obtaining unit 102, and a user response analyzing unit 103.

The eye gaze detecting unit 101 detects an eye gaze direction of the user. In other words, the eye gaze detecting unit 101 detects the direction in which the user is looking.

In the embodiment, the eye gaze detecting unit 101 further calculates a gaze coordinate system indicating, on the screen, a movement locus of a position at which the user is gazing. Specifically, based on the gaze direction and the position of the user, the eye gaze detecting unit 101 calculates, as a gaze position, a point at the intersection of the screen and the straight line extending from the user in the gaze direction. Then, the eye gaze detecting unit 101 obtains, as the gaze coordinate system, chronological coordinates indicating the calculated gaze position. In other words, the eye gaze detecting unit 101 calculates a temporal change of the eye gaze direction.

It is noted that the position of the user may be detected using, for example, a parallax of a user image in a stereo image captured by a stereo camera. Moreover, the user position may be detected based on pressure detected by a pressure sensor provided to the floor in front of the screen.

The saliency information obtaining unit 102 obtains saliency information on a saliency area. For example, the saliency information obtaining unit 102 obtains the saliency information by analyzing a video. For example, the saliency information obtaining unit 102 may obtain the saliency information from a tag attached to a signal showing the video. The tag is information to be assigned to the signal showing the video or an area to hold the information. The tag is also referred to as header or header information.

It is noted that, the saliency area has salient attractiveness in the video. In other words, the saliency area found in a video is likely to attract visual attention of the user.

The saliency information includes information indicating the position of a saliency area, for example. Moreover, the saliency information may include information on the saliency shift showing the temporal shift pattern of a saliency area.

The user response analyzing unit 103 calculates a correlation between the saliency area specified from the obtained saliency information and the detected eye gaze direction. In other words, the user response analyzing unit 103 calculates a value showing the degree of correlation between the saliency area in the video and the eye gaze direction.

Specifically, for example, the user response analyzing unit 103 calculates as the correlation a degree of temporal synchronization between the saliency area and the eye gaze direction. Moreover, for example, the user response analyzing unit 103 may calculate as the correlation a degree of spatial similarity between the saliency area and the eye gaze direction. It is noted that the user response analyzing unit 103 may calculate the correlation based on both the temporal synchronization degree and the spatial similarity degree.

The user response analyzing unit 103 estimates the degree of interest of the user in the video so that the degree of interest is higher as the calculated correlation is higher.

Described next are various operations of the above degree of interest estimating device 100.

Figure 2:
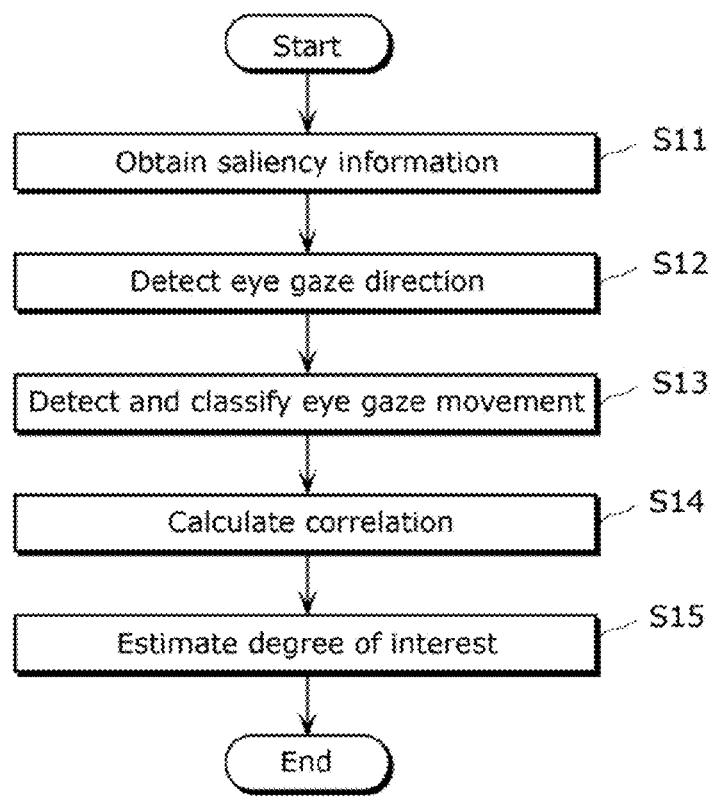
FIG. 2 depicts a flowchart showing operations of the degree of interest estimating device according to the embodiment of the present invention.

FIG. 2 depicts a flowchart showing an operation of the degree of interest estimating device according to the embodiment of the present invention.

First, the saliency information obtaining unit 102 obtains saliency information (S11). The saliency information includes information indicating the position of a saliency area in the video, and information on a saliency shift showing the temporal shift pattern of the saliency area.

The eye gaze detecting unit 101 detects an eye gaze direction of the user (S12). Here, the eye gaze detecting unit 101 calculates a gaze coordinate system based on the detected eye gaze direction.

Then the user response analyzing unit 103 calculates a correlation between (i) the saliency area specified from the saliency information obtained by the saliency information obtaining unit 102 and (ii) the eye gaze direction detected by the eye gaze detecting unit 101 (S13).

Then the user response analyzing unit 103 calculates a correlation between the saliency shift and a change of the eye gaze detected by the eye gaze detecting unit 101 (S14). Based on the calculated correlation, the user response analyzing unit 103 estimates a degree of interest in the video (S15). Specifically, the user response analyzing unit 103 estimates the degree of interest of the user in the video so that the degree of interest is higher as the calculated correlation is stronger.

It is noted that the processing of Step S11 and the processing of Steps S12 and S13 may be simultaneously executed. The processing of Step S11 and the processing of Steps S12 and S13 may be executed in reverse. In other words, the processing of Step S11 may follow the processing of Steps S12 and S13. Moreover, the processing of Step S13 may be omitted.

As described above, the degree of interest estimating device 100 estimates a degree of interest of the user in a video shown on the screen.

Detailed below are the processing operations of the degree of interest estimating device 100, with reference to the drawings.

<1. Obtaining Saliency Information>

Detailed first is how to obtain the saliency information. Described here is how the saliency information obtaining unit 102 obtains the saliency information through an analysis of the video.

FIG. 3 depicts a conceptual diagram showing a saliency structure according to the embodiment of the present invention.

The saliency area is an area to be likely to attract visual attention in each of frames in the video (illustration (a) in FIG. 3). In a video, the saliency degree and position of the saliency area change with a change of time.

The spatiotemporal volume of the saliency area with such a change is referred to as saliency flow. Multiple saliency flows found in the video is collectively-referred to as saliency structure of the video (illustration (b) in FIG. 3).

The saliency area is obtained through calculation of a saliency map for each of the frames included in the video. The saliency map can be obtained by a calculation technique introduced in Non-patent Literature "Itti, L. and Koch, C.: Computational modeling of visual attention. Nature Reviews Neuroscience, 2(3), pp. 194-203".

Here, the saliency information obtaining unit 102 specifies the saliency area through an analysis of the video based on physical characteristics of an image. The physical characteristics of the image may include luminance, color, and contrast.

A typical example of the saliency area is an area of a moving object. The moving object may be a person. The moving object may be an animal.

Another typical example of the saliency area is an area for an object which closely relates to audio information that comes with the video. Here, the object may be the mouth or the face of a speaker in the video. Furthermore, the saliency area may be an area to show a text message corresponding to the audio information.

Based on a temporal adjacency relationship between the saliency areas, the saliency information obtaining unit 102 further clusters the saliency area included in each of the frames so as to obtain a saliency flow. The saliency flow includes, as attributes, the saliency degree, the position of the center of the gravity, and the area of a temporally-changing saliency area.

Then the saliency information obtaining unit 102 segments the saliency flow into two state sequences; that is, "the dynamic state where the position changes temporally" and "the static state where the position does not change temporally".

A saliency structure has multiple saliency flows. The saliency structure can be classified into multiple saliency patterns based on at least one of the number and a motion of saliency areas.

FIGS. 4A to 4E show kinds of saliency patterns according to the embodiment of the present invention. Each of the graphs in FIGS. 4A to 4E shows a temporally changing position of a saliency area. In each graph, the ordinate shows the position on the screen and the abscissa shows time.

Figure 4A:
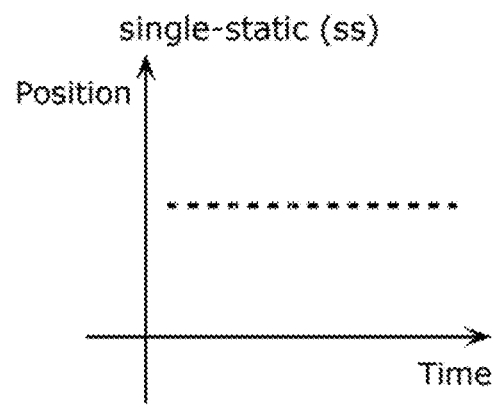
FIG. 4A shows a saliency pattern according to the embodiment of the present invention.
Figure 4B:
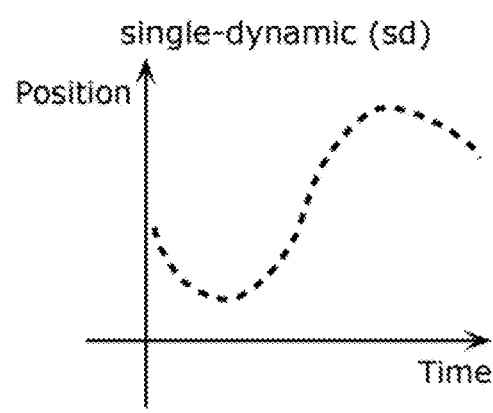
FIG. 4B shows a saliency pattern according to the embodiment of the present invention.
Figure 4C:
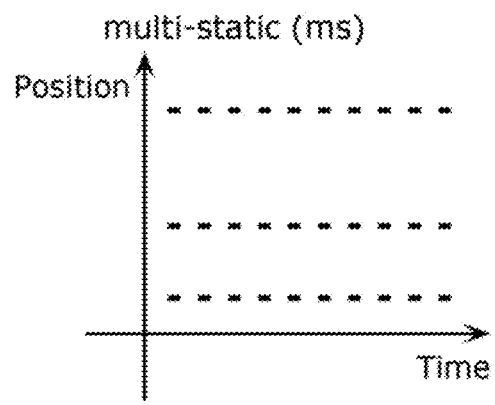
FIG. 4C shows a saliency pattern according to the embodiment of the present invention.
Figure 4D:
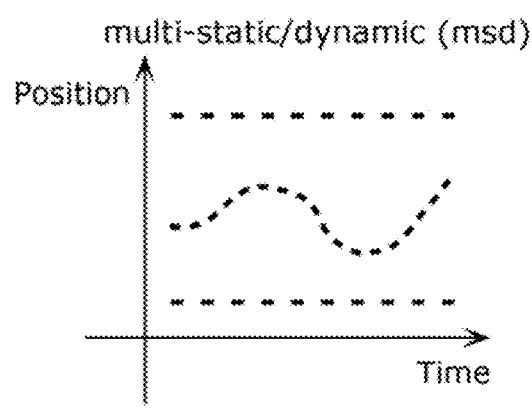
FIG. 4D shows a saliency pattern according to the embodiment of the present invention.
Figure 4E:
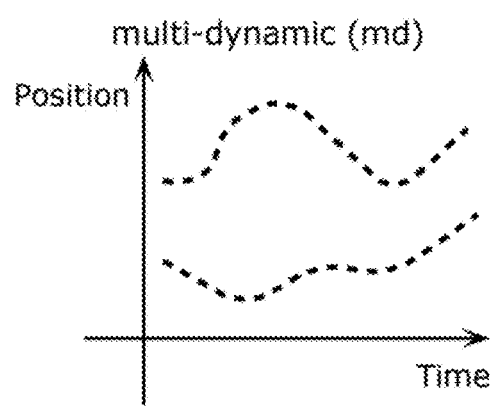
FIG. 4E shows a saliency pattern according to the embodiment of the present invention.

Here, the multiple saliency patterns include five kinds of saliency patterns: the single-static pattern (ss: single-static in FIG. 4A), the single-dynamic pattern (sd: single-dynamic in FIG. 4B), the multiple-static pattern (ms: multi-static in FIG. 4C), the multiple-static and dynamic pattern (msd: multi-static dynamic in FIG. 4D), and the multiple-dynamic pattern (md: multi-dynamic in FIG. 4E).

The saliency structure is segmented into sequences having the saliency patterns. It is noted that in the multiple-static and dynamic pattern, some of the flows are dynamic and the rest of the flows are static.

Figure 5:
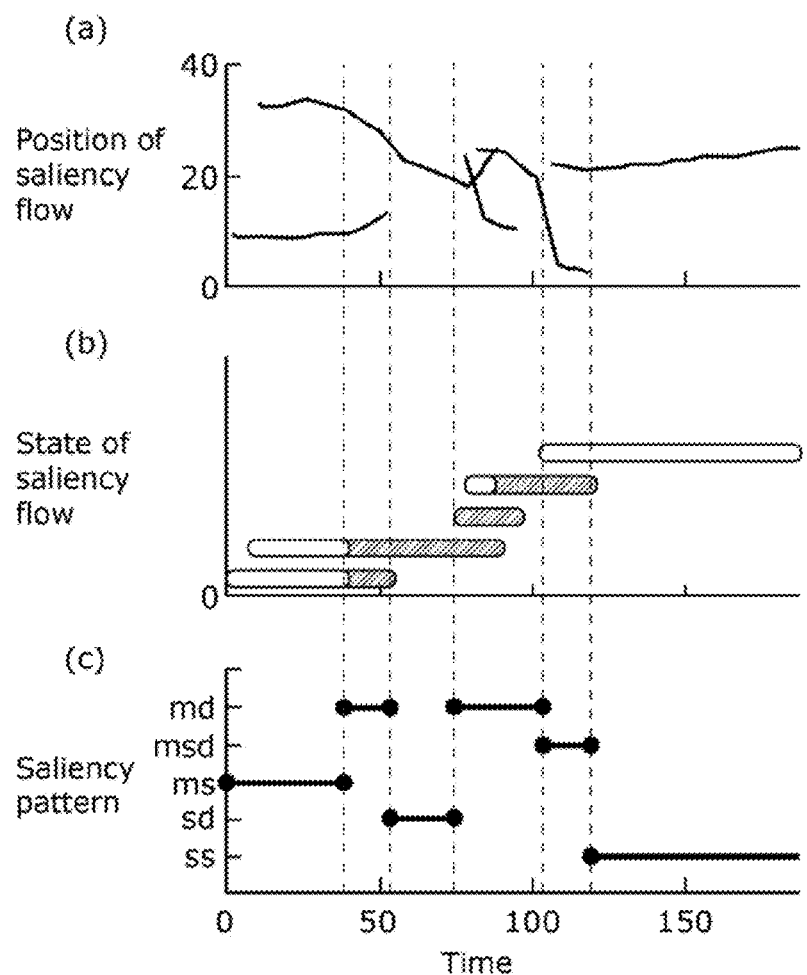
FIG. 5 chronologically exemplifies saliency patterns according to the embodiment of the present invention.

FIG. 5 chronologically exemplifies saliency patterns according to the embodiment of the present invention. Specifically, the illustration (a) depicts a graph showing a temporal transition of the position of the saliency area. For the sake of the convenience of explanation, the position of the saliency area is shown in one dimension.

The illustration (b) in FIG. 5 depicts a graph showing a temporal transition of each of the states of the saliency flows. Each bar graph shows one of the states of the saliency flows. Specifically, the white-out part of a bar graph shows that the saliency flow is static. The hatched part of a bar graph shows that the saliency flow is dynamic.

The illustration (c) in FIG. 5 depicts a graph showing a temporal transition of the saliency patterns. First, the graph shows that the saliency pattern is the multiple-static pattern (ms), and then transits to the multiple-dynamic pattern (md).

As described above, the saliency information obtaining unit 102 specifies the saliency area through an analysis of the video. Consequently even though the saliency information of a provided video is unknown, the saliency information obtaining unit 102 can obtain the saliency information of the video, and accurately estimate the degree of interest of the video.

Then, based on the number and motion of the specified saliency areas, the saliency information obtaining unit 102 determines a saliency pattern. The saliency information corresponds to information showing the specified saliency areas and information showing the saliency pattern.

It is noted that the saliency information obtaining unit 102 does not necessarily have to analyze the video. For example, the saliency information obtaining unit 102 may obtain the saliency information from a tag attached to a signal showing the video. This feature allows the saliency information obtaining unit 102 to easily obtain the saliency information.

Here, the tag needs to include, for example, information on the saliency area obtained through the analysis of the video. Moreover, the tag may include information previously entered by a video producer and showing the saliency area.

<2. Detecting Eye Gaze Direction>

Detailed next is the eye gaze direction detection processing (S12) for detecting an eye gaze direction.

In the present embodiment, the eye gaze direction is calculated based on the combination of the orientation of the user's face (hereinafter, referred to as face orientation) and the direction of the black part of the eye relative to the face orientation of the user (hereinafter, referred to as black-part-of-the eye direction). Thus the eye gaze detecting unit 101 first estimates the three-dimensional face orientation of a person. Next the eye gaze detecting unit 101 estimates the black-part-of-the-eye direction. Finally the eye gaze detecting unit 101 calculates the eye gaze direction, combining the face orientation and the black-part-of-the-eye direction.

It is noted that the eye gaze detecting unit 101 does not necessarily have to calculate the eye gaze direction based on the combination of the face orientation and the black-part-of-the-eye direction. For example, the eye gaze detecting unit 101 may calculate the eye gaze direction based on the center of the eyeball and the center of the iris (black part of the eye). In other words, the eye gaze detecting unit 101 may calculate, as the eye gaze direction, a three-dimension vector between a three-dimensional position of the center of the eyeball and a three-dimensional position of the center of the iris (black part of the eye).

Figure 6A:
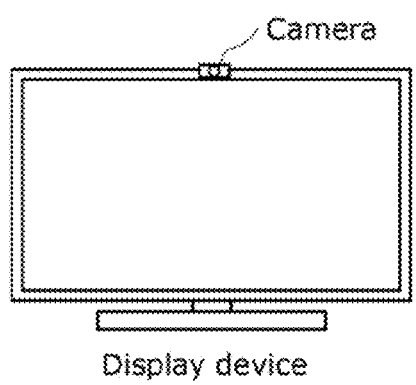
FIG. 6A exemplifies how to place an image capturing device which captures an image obtained in eye gaze direction detection processing according to the embodiment of the present invention.
Figure 6B:
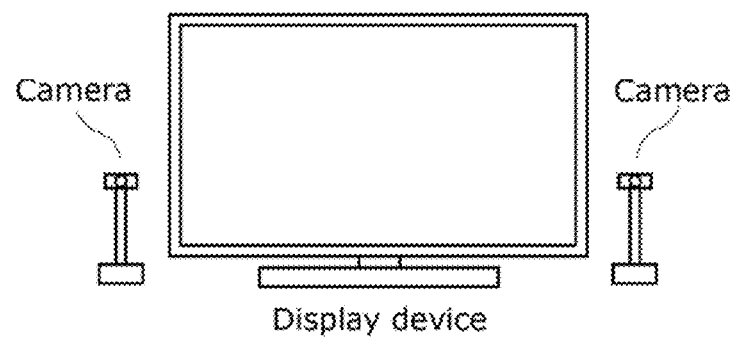
FIG. 6B exemplifies how to place an image capturing device which captures an image obtained in eye gaze direction detection processing according to the embodiment of the present invention.
Figure 6C:
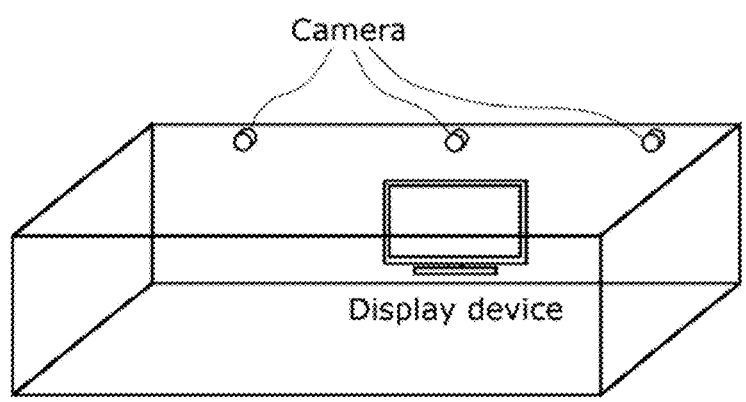
FIG. 6C exemplifies how to place an image capturing device which captures an image obtained in eye gaze direction detection processing according to the embodiment of the present invention.

Each of FIGS. 6A to 6C exemplifies how to place an image capturing device (camera) which captures an image obtained in eye-gaze direction detection processing according to the embodiment of the present invention. As shown in FIGS. 6A to 6C, the image capturing device is provided near the display, so that the image capturing device can capture an image of the user in front of the screen of the display device.

Figure 7:
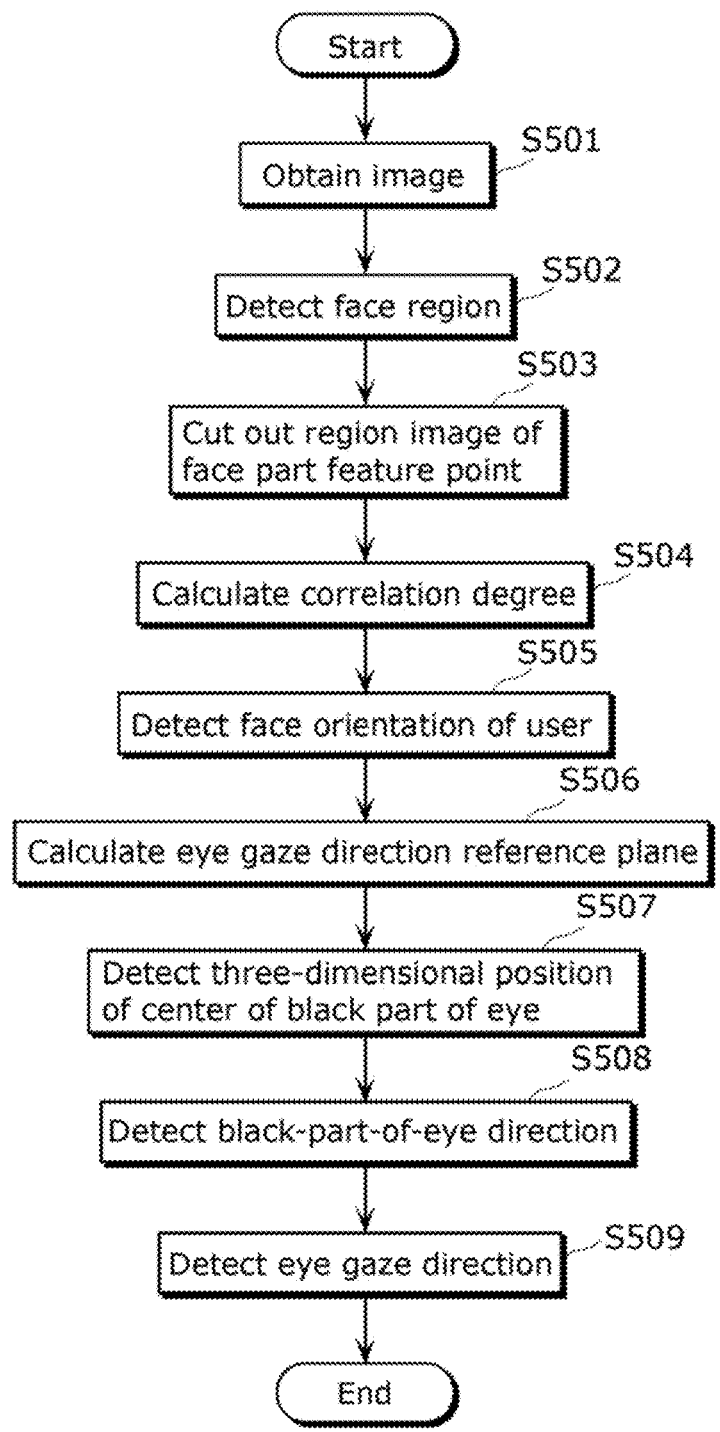
FIG. 7 depicts a flowchart showing eye gaze direction detection processing according to the embodiment of the present invention.

FIG. 7 depicts a flowchart showing eye gaze direction detection processing according to the embodiment of the present invention.

First the eye gaze detecting unit 101 obtains an Image, captured by the image capturing device, of the user who is in front of the screen (S501). Then the eye gaze detecting unit 101 detects a face region out of the obtained image (S502). Next the eye gaze detecting unit 101 applies, to the detected face region, regions each having a face part feature point, and cuts out a region image of each face part feature point (S503). Here, the face part feature point is associated with each reference face orientation.

The eye gaze detecting unit 101 then calculates correlation degrees between the cut-out region images and pre-stored template images (S504). Then, based on the ratio of the calculated correlation degrees, the eye gaze detecting unit 101 calculates a weighted sum by weighting and adding angles of the corresponding reference face orientations. Finally, the eye gaze detecting unit 101 detects the weighted sum as the user's face orientation corresponding to the detected face region (S505).

Figure 8:
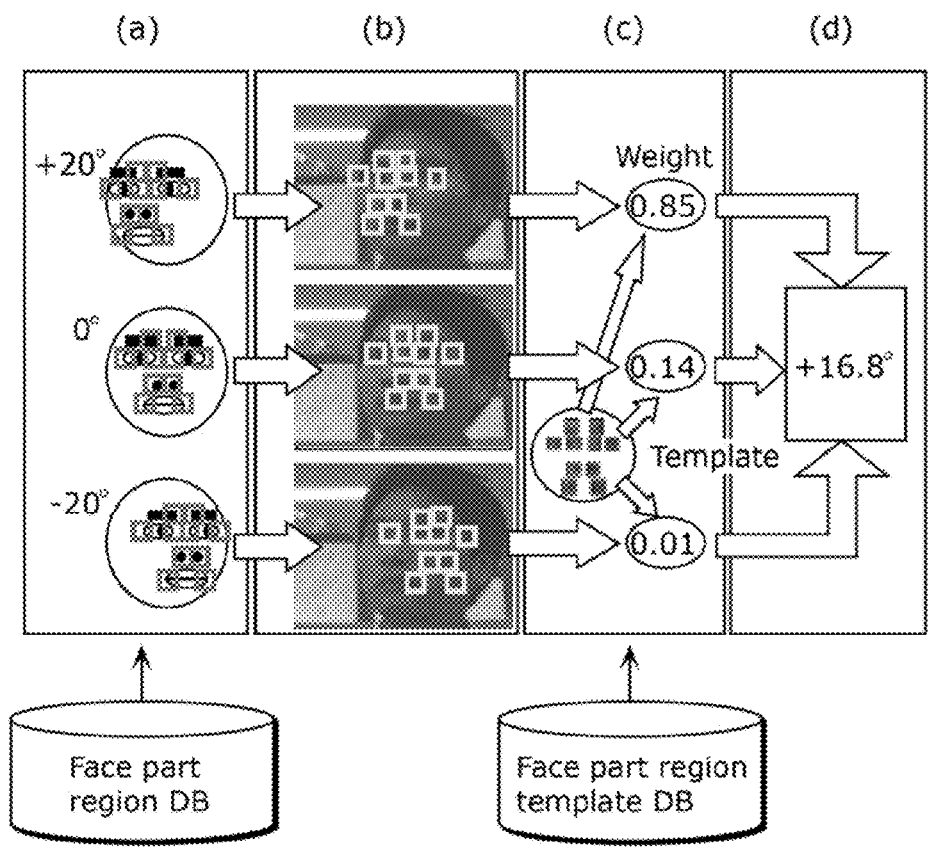
FIG. 8 depicts a diagram showing processing of face orientation detection in the eye gaze direction detection processing according to the embodiment of the present invention.

FIG. 8 is a diagram showing processing of the face orientation detection in the eye gaze direction detection processing according to embodiment of the present invention.

As shown in the illustration (a) in FIG. 8, the eye gaze detecting unit 101 reads out regions each having a face part feature point from a face part region database (DB) storing regions of face part feature points for each reference face orientation. As shown in the illustration (b) in FIG. 8, the eye gaze detecting unit 101 then (i) applies the regions having the face part feature points to a face region of a captured image for each reference face orientation, and (ii) cuts out a region image having the face part feature points for each reference face orientation.

Then, as shown in the illustration (c) in FIG. 8, the eye gaze detecting unit 101 calculates, for each reference face orientation, a correlation degree between the cut out region image and a template image stored in the face part region template DB. The eye gaze detecting unit 101 also calculates a weight for each reference face orientation according to the magnitude of the calculated correlation degree. For example, the eye gaze detecting unit 101 calculates, as the weight, the ratio of the correlation degree for each reference face orientation to the total sum of the degrees of correlation of the reference face orientations.

After that, as shown in the illustration (d) in FIG. 8, the eye gaze detecting unit 101 calculates the total sum of the values each of which is obtained by multiplying the angle of the reference face orientation by the calculated weight, and detects the calculation result as the face orientation of the user.

In the example of the illustration (d) of FIG. 8, weighting and detection of the face orientation are as follows: the angle of a reference face orientation plus 20 degrees is weighted "0.85"; the angle of facing front is weighted "0.14"; and the angle of a reference face orientation minus 20 degrees is weighted "0.01". Thus, the eye gaze detecting unit 101 detects the face orientation to be 16.8 degrees (=20×0.85+0×0.14+(−20)×4.01).

In FIG. 8, the eye gaze detecting unit 101 employs a region image having a face part feature point to calculate a correlation degree; however, the embodiment of the present invention is not limited to this. For example, the eye gaze detecting unit 101 may calculate a correlation degree employing an image having the entire face region.

Other exemplary techniques for detecting a face orientation are to detect face part feature points, such as an eye, a nose, or a mouth, from a face image, and calculate the face orientation based on the positional relation of the face part feature points.

One of the techniques to calculate a face orientation based on the positional relation of the face part feature points is to rotate, enlarge, and reduce a previously-prepared three-dimensional model of a face part feature point so that the three-dimensional model most matches a face part feature point obtained from one camera, and calculate the face orientation from the obtained rotation amount of the three-dimensional model.

Another technique to calculate a face orientation based on the positional relation of the face part feature points is to (i) calculate a three-dimensional position for each face part feature point out of a mismatch found on the images of positions of face part feature points in the right and left cameras, using the principle of stereo disparity based on images captured by two cameras to, and (ii) obtain the face orientation based on the positional relation of the obtained face part feature points. Specifically, the technique involves detecting, as the face orientation, a direction of a normal line on a plane including three-dimensional coordinate points of a mouth and both eyes.

Now, the description continues with reference to the flowchart of FIG. 7.

The eye gaze detecting unit 101 detects three-dimensional positions of inner corners of both eyes of the user using a stereo image captured by an image capturing device, and calculates an eye gaze direction reference plane using the detected three-dimensional positions of the inner corners of the both eyes (S506). After that, the eye gaze detecting unit 101 detects the three-dimensional positions of the centers of the black parts of the both eyes of the user, using the stereo image captured by the image capturing device (S507). The eye gaze detecting unit 101 then detects the black-part-of-the-eye direction, using the three-dimensional positions of the centers of the black parts of the both eyes and the eye gaze direction reference plane (S508).

Then the eye gaze detecting unit 101 detects the eye gaze direction of the user, using the detected user's face orientation and the black-part-of-the-eye direction (S509).

Detailed next is how to detect the black-part-of-the-eye direction with reference to FIGS. 9 to 11.

In the embodiment, the eye gaze detecting unit 101 first calculates an eye gaze direction reference plane. The eye gaze detecting unit 101 then detects the three-dimensional position of the center of the black part of the eye. Finally, the eye gaze detecting unit 101 detects the black-part-of-the-eye direction.

Described first is how to calculate the eye gaze direction reference plane.

Figure 9:
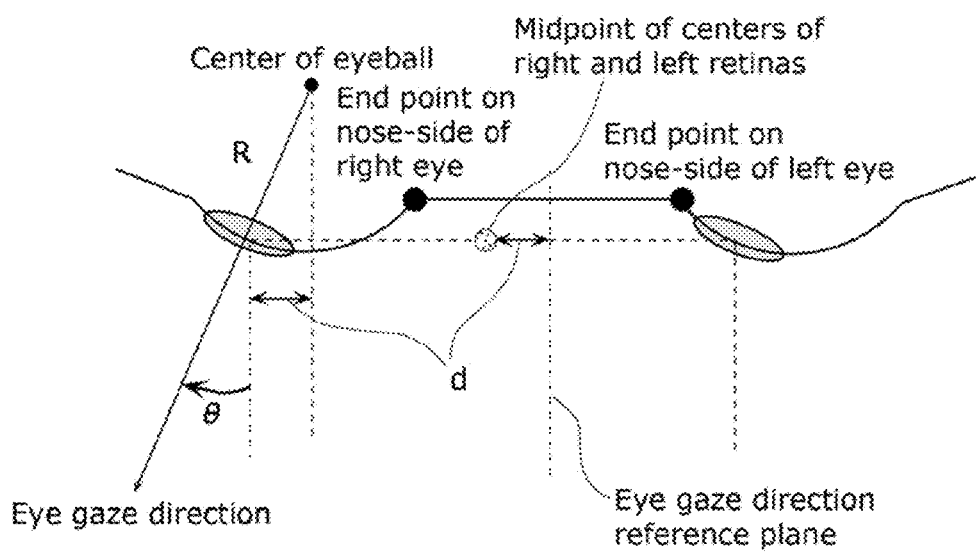
FIG. 9 depicts a diagram showing calculation of an eye gaze direction reference plane according to the embodiment of the present invention.

FIG. 9 depicts a diagram showing calculation of an eye gaze direction reference plane according to the embodiment of the present invention.

Used as a reference in detecting the black-part-of-the eye direction, the eye gaze direction reference plane is a bilateral symmetry plane of a face as shown in FIG. 9. The positions of the inner corners of the eyes show fewer facial movements than other face parts such as the tails of the eyes, corners of a mouth, or eyebrows, and thus cause less false detection. Thus the eye gaze detecting unit 101 calculates the eye gaze direction reference plane that is the bilateral symmetric plane of the face, using the three-dimensional positions of the inner corners of the eyes.

More particularly, the eye gaze detecting unit 101 detects the inner corner regions of both eyes for each of two images (stereo images) captured by a stereo camera that is an image capturing device, using a face detection module and a face part detection module. The eye gaze detecting unit 101 then measures the three-dimensional positions of the inner corners of the both eyes, based on a mismatch (disparity) between the images of the detected inner corner regions. Furthermore, as shown in FIG. 9, the eye gaze detecting unit 101 calculates, as the eye gaze direction reference plane, the perpendicular bisecting plane dividing a segment whose endpoints start at the three-dimensional positions of the inner corners of the both eyes.

Described next is how to detect the center of the black part of the eye.

FIGS. 10 and 11 depict diagrams showing the detection of the center of the black part of the eye according to the embodiment of the present invention.

People visually recognize an object when light from the object arrives at the retina via the pupil and is converted into an electric signal, and then the electric signal is transmitted to the brain. Thus the eye gaze direction can be detected based on the position of the pupil. However, the iris of Japanese people's eye is black or blown. Thus, it is difficult to distinguish between a pupil and an iris through image processing. The center of the pupil approximately matches with the center of the black part of an eye (including both of the pupil and the iris). Hence, in the embodiment, the eye gaze detecting unit 101 detects the center of the black part of the eye when detecting the direction of the black part of the eye.

First the eye gaze detecting unit 101 detects the positions of the corner and the tail of an eye from a captured image. Then, as a black-part-of-eye region, the eye gaze detecting unit 101 detects a region with little luminance from an area including the corner and the tail of the eye as shown in FIG. 10. Specifically, for example, the eye gaze detecting unit 101 detects, as the black-part-of-the-eye region, a region whose (i) luminance is equal to or smaller than a predetermined threshold and (ii) size is greater than a predetermined size.

Next the eye gaze detecting unit 101 sets a black-part-of-the-eye detecting filter to any given position in the black-part-of-the eye region. Here the eye gaze detecting unit 101 includes a first region and a second region as shown in FIG. 11. Then the eye gaze detecting unit 101 searches for a position, of the black-part-of-the-eye detecting filter, at which an inter-regional dispersion between (i) the luminance of a pixel in the first region and (ii) the luminance of a pixel in the second region is the greatest. The eye gaze detecting unit 101 then detects the position indicated in the search result as the center of the black-part-of-the-eye. Similar to the above, the eye gaze detecting unit 101 finally detects the three-dimensional position of the center of the black-part-of-the-eye, based on the mismatch of the centers of the black-part-of-the-eyes in the stereo image.

Furthermore, described is how to detect the black-part-of-the-eye direction.

The eye gaze detecting unit 101 detects a black-part-of-the-eye direction based on the calculated eye gaze direction reference plane and the detected three-dimensional position of the center of the black-part-of-the-eye. Adult eyeballs rarely vary in diameter from person to person. In the case of Japanese people, for example, the diameter is approximately 24 mm. Once the position of the center of the black part of the eye is found when a user looks into a reference direction (front, for example), the eye gaze detecting unit 101 obtains displacement from the center positions to current center positions of the black part of the eyes. Then the eye gaze detecting unit 101 calculates to convert the obtained displacement into the black-part-of-the-eye direction.

When the user faces the front, the midpoint of the centers of the black parts of the both eyes is in the middle of the face, that is, on the gaze direction reference plane. Taking advantage of this phenomenon, the eye gaze detecting unit 101 calculates the distance between the midpoint of the centers of the black parts of the both eyes and the gaze direction reference plane to detect the black-part-of-the-eye direction.

Specifically, using the eyeball radius "R" and the distance d" between the midpoint of the segment lying across the centers of the black parts of the both eyes and the eye gaze direction reference plane, the eye gaze detecting unit 101 detects, as the black-part-of-the-eye direction, a rotational angle θ in a horizontal direction with respect to a face orientation as shown in Expression 1.

[Math. 1]

$$\theta = \sin^{-1}\left(\frac{d}{R}\right) \qquad \text{Expression 1}$$

As described above, the eye gaze detecting unit 101 detects the black-part-of-the-eye direction, based on the eye gaze direction reference plane and three-dimensional positions of the centers of the black parts of both of the eyes. Then, based on the detected user's face orientation and black-part-of-the-eye direction, the eye gaze detecting unit 101 detects the gaze direction of the user in a real space.

Various kinds of techniques are available for detecting the eye gaze direction, including the corneal reflex technique, the electrooculography (EGO) technique, the search coil technique, and the scleral reflex technique. Thus the eye gaze detecting unit 101 does not necessarily use the above described technique to detect the eye gaze direction. For example, the eye gaze detecting unit 101 may use the corneal reflex technique to detect the gaze direction.

The corneal reflex technique is to measure an eye movement based on a position of a corneal reflex image (purkinje image) that appears brightly when point light illumination is irradiated on a cornea. The center of eyeball rotation and the center of convex of a cornea do not match. Thus, when the cornea is regarded as a convex mirror and reflection points of a light source are collected by a convex lens or the like, the collected point moves along the rotation of the eyeball. The points are captured by the image capturing device, and the eye movement is measured.

<3. Detecting and Classifying the Eye Gaze Movement>

Described next is how to detect eye gaze movements based on the eye gaze data (the gaze coordinate system) detected above, and classify the detected eye gaze movements.

Here, the "interest" of a user in a video may be defined that the user "pays attention" to the video. The attention may be defined as processing resource. An amount of the processing resource required to a task varies depending on the difficulty level of the task. The action "paying one's attention" may be represented as assigning the processing resource to the task.

In other words, the phenomenon "paying one's attention" to the video can be understood as assigning a processing resource to a task of video viewing. This is known as Kahneman's capacity model. When a degree of interest is described as a parameter based on the concept of processing resource, the degree of interest is the amount of a processing resource to be assigned to the video viewing task.

Meanwhile, information processing performed by a person may be classified into conscious and controlled processing and subconscious and automatic processing. The controlled processing is consciously performed by a person. When the controlled processing is carried out, a processing resource is required. The eye gaze movement to be carried out as controlled processing in the video viewing task is referred to as endogenous eye gaze movement. The eye gaze movement to be carried out as automatic processing is referred to as exogenous eye gaze movement.

Here, modeled below is how a degree of interest affects an eye gaze movement.

First, based on psychological factors such as an intention of the user and on physiological factors such as fatigue, a processing resource according to the degree of interest of a user is assigned to the video viewing task. According to the processing resource, the controlled processing is carried out. Then an endogenous eye gaze movement occurs. In contrast, visual stimulation of the video (saliency flow) causes the exogenous eye gaze movement as the automatic processing. It is noted that in the case where the endogenous eye gaze movement has already occurred, the exogenous eye gaze movement can be reduced. Such an eye gaze movement is physically observed as an actual gaze coordinate system on the screen. The user response analyzing unit 103 estimates, as an inverse problem of "processing resource consumption to eye gaze movement execution", the amount of the processing resource assigned to the video viewing task from the physically observed eye gaze movement. Then the user response analyzing unit 103 estimates the degree of interest in the video.

FIG. 12 shows eye gaze movements and elements of the eye gaze movements according to the embodiment of the present invention.

In viewing a video, a person alternately obtains visual information of an object and changes the object to another object. Taking the state of the object and a factor to cause an eye gaze movement into consideration, the eye gaze movement in video viewing here is classified into four kinds of eye gaze movements described below.

The first eye gaze movement is an action to obtain information from a moving object (PA: Pursuing Acquisition). The second eye gaze movement is an action to obtain information from a static object (FA: Fixation Acquisition). The third eye gaze movement is an intentional object-changing action (NC: eNdogenous Change). The fourth eye gaze movement is an exogenous object-changing action (XC: exogenous Change).

In general, a person obtains information with the combination of gazing a point and changing points of gaze. In other words, the eye gaze movements in video viewing have dynamics therein, and each of the eye gaze movements is made out of simple eye gaze movements (elements) as shown in FIG. 12. Here, the eye gaze movements in video viewing are expressed with four simple eye gaze movements below as the elements.

The first element is a smooth eye pursuit (P: Pursuit). In the smooth eye pursuit, eyeballs smoothly pursuit a moving object.

The second element is a fixation (F: Fixation). In the fixation, eyeballs do not move since the person keeps looking at the static object.

The third element is an endogenous saccade (NS: eNdogenous Saccade). Saccades are quick eye movements to catch an object, projected on peripheral retina having low resolution, on fovea centralis retinae having high resolution. The endogenous saccade is a conscious saccade in the saccades.

The fourth element is an exogenous saccade (XS: exogenous Saccade). The exogenous saccade is a subconscious saccade in the saccades.

Here, at a stage prior to estimating a degree of interest, the eye gaze detecting unit 101 detects the eye gaze movement from the gaze coordinate system. In other words, the eye gaze detecting unit 101 segments the gaze coordinate system into time zones in which an independent eye gaze movement can occur. Specifically, the eye gaze detecting unit 101 segments the gaze coordinate system based on a flow of a target to be gazed at, and further segments the gaze coordinate system based on the state of the corresponding flow being whether static or dynamic. Then, in order to handle highly-correlated groups of saliency flows as a single target, the eye gaze detecting unit 101 merges the time zones in which a change of gaze is occurring between highly-correlated two flows.

<4. Analyzing a Correlation Between a Saliency Shift and a Gaze Response (Degree of Interest Estimation)>

Described next are the details of the degree of interest estimation based on an analysis of a correlation between a saliency shift and gaze response.

FIG. 13 shows a relationship between a saliency shift and a gaze response according to the embodiment of the present invention. Specifically, the illustration (a) in FIG. 13 shows (i) a temporal match in each of frames when the degree of interest is high, and (ii) a temporal mismatch in each of the frames when the degree of interest is low. Moreover, the illustration (b) in FIG. 13 shows (i) a spatial mismatch in each of the frames when the degree of interest is high, and (ii) a spatial mismatch in each of the frames when the degree of interest is low.

When the degree of interest in the video is high, the temporal mismatch and the spatial mismatch in the frame between the saliency shift and an eye gaze movement are small. Here, the eye gaze movement is expected to occur in response to the saliency shift. In contrast, when the degree of interest in the video is low, the temporal mismatch and the spatial mismatch in the frame between the saliency shift and the gaze response are large.

In other words, the temporal and spatial mismatches show how the correlation is low between the saliency area and the eye gaze direction. In the embodiment, the user response analyzing unit 103 calculates a value showing at least one of the temporal mismatch and the spatial mismatch as a value showing how low the correlation is between the saliency area and the eye gaze direction.

One of the examples of the temporal mismatch is a time difference between a time when the saliency area appears and a time when a saccade of the eye gaze for the saliency area occurs. Another examples of the temporal mismatch is a time difference between a time when the saliency area moves on the screen at a predetermined speed or faster and a time when a saccade of the eye gaze direction at the saliency area occurs. One of the examples of the temporal mismatch and the spatial mismatch is a speed difference between a moving speed of the saliency area on the screen and a moving speed of the gaze position, on the screen, specified from the eye gaze direction.

It is noted that whether or not the eye gaze movement is a saccade may be determined by, for example, whether or not the value indicating a degree of change in eye gaze direction exceeds a threshold value. Specifically, the timing when the gaze position moves at a predetermined speed or faster may be determined as the timing when the saccade occurs.

Focusing on the above characteristics, the degree of interest in an video is estimated as described below.

FIG. 14 shows evaluation criteria each corresponding to one of the saliency patterns according to the embodiment of the present invention.

As shown in FIG. 14, each of the saliency patterns is previously associated with at least one of the evaluation criteria for evaluating the degree of correlation. The information showing a corresponding relationship between a saliency pattern and an evaluation criterion may be held, for example, in a not-shown storage unit (memory). Here, the storage unit may be included, for example, in the degree of interest estimating device 100. Moreover, the storage unit may be included in an external device connected to the degree of interest estimating device 100.

With reference to the information shown in FIG. 14, the user response analyzing unit 103 calculates the correlation according to at least one of the evaluation criteria associated with one of the saliency patterns, which is specified from the obtained saliency information.

Described below are the evaluation criteria.

FIGS. 15A to 15E show an evaluation criterion associated with a saliency pattern according to the embodiment of the present invention.

Figure 15A:
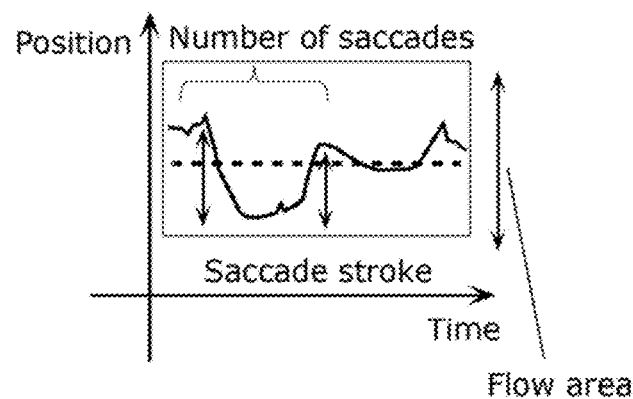
FIG. 15A shows an evaluation criterion corresponding to a saliency pattern according to the embodiment of the present invention.
Figure 15B:
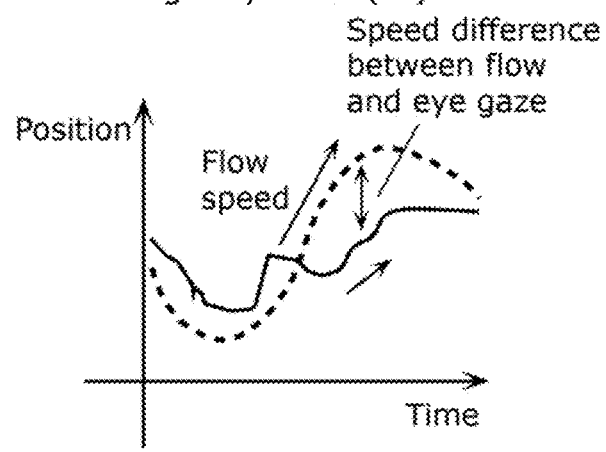
FIG. 15B shows an evaluation criterion corresponding to a saliency pattern according to the embodiment of the present invention.
Figure 15C:
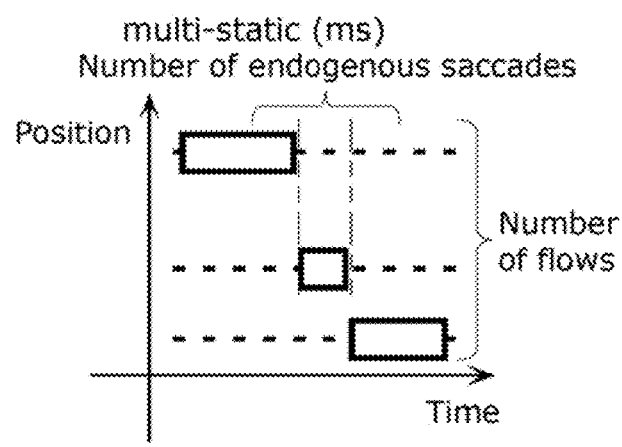
FIG. 15C shows an evaluation criterion corresponding to a saliency pattern according to the embodiment of the present invention.
Figure 15D:
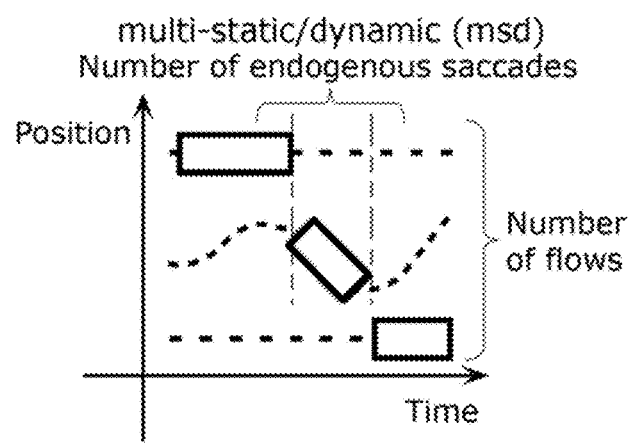
FIG. 15D shows an evaluation criterion corresponding to a saliency pattern according to the embodiment of the present invention.
Figure 15E:
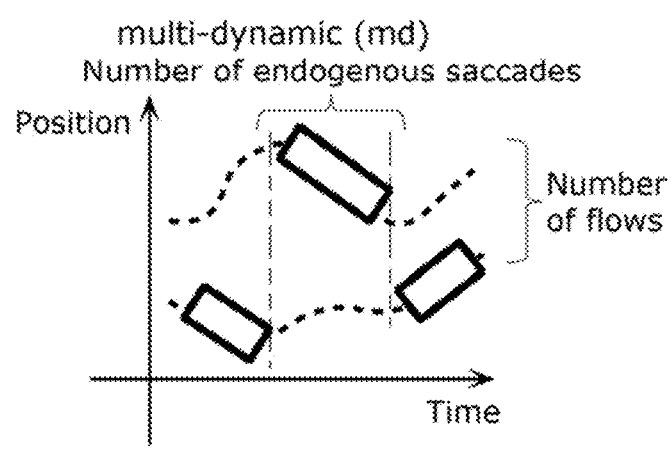
FIG. 15E shows an evaluation criterion corresponding to a saliency pattern according to the embodiment of the present invention.

When the degree of interest of a user in the video is high as shown in FIGS. 14 and 15A, the FA is expected to be observed as the eye gaze movement in the single-static. When the degree of interest of the user in the video is high as shown in FIGS. 14 and 15B, the PA is expected to be observed as the eye gaze movement in the single-dynamic. When the degree of interest of the user in the video is high as shown in FIGS. 14 and 15C, the FA and the NS are expected to be observed as the eye gaze movements in the multi-static. When the degree of interest of the user in the video is high as shown in FIGS. 14 and 15D, the FA, the PA, and the NS are expected to be observed as the eye gaze movements in the multi-static/dynamic. When the degree of interest of the user in the video is high as shown in FIGS. 14 and 15E, the PA and the NS are expected to be observed as the eye gaze movements in the multi-dynamic.

In FIG. 14, the single-static is associated with, as evaluation criteria, the number of saccades, the stroke length of saccades, and an area of a target flow.

The number of saccades means the occurrence frequency of the saccades detected when the saliency pattern is the single-static. The saccades are detected in a comparison between a value indicating a degree of change in eye gaze direction and a threshold value. Specifically, for example, detected as the number of succeeds is how many times the gaze position moves at a predetermined speed or faster in the saliency area on the screen.

Moreover, the stroke length of saccades is a value indicating an amount of change observed in the eye gaze direction and caused by saccades. Specifically, the stroke length of saccades corresponds to, for example, the moving distance, of the gaze position, caused by the saccades and found on the screen.

The area of the target flow corresponds to the area of a saliency area. When the area of the saliency areas for a saliency flow has changed, the area of the target flow is, for example, the average value of the areas of the saliency areas. Moreover, the area of the target flow may also be the median value, the maximum value, or the minimum value of the areas of the saliency areas.

The single-dynamic is associated with, as evaluation criteria, the speed difference between the target flow and the eye gaze movement and with the motion speed of the target.

The speed difference between the target flow and the eye gaze movement is equivalent to the speed difference between the motion speed of the saliency area and the motion speed of the gaze position. Here the motion speed is the magnitude and direction of the motion vector. Moreover, the motion speed of the target is equivalent to the motion speed of the saliency area.

The multi-static is associated with, as evaluation criteria, the evaluation criterion that is associated by the single-static, and with the occurrence frequency of the NS.

The occurrence frequency of the NS indicates how many times saccades occur between saliency areas. In other words, the occurrence frequency of the NS is equivalent to the number of saccades each of which moves a gaze position from one saliency area to another saliency area.

The multi-static/dynamic is associated with, as evaluation criteria, (i) the evaluation criteria associated with the single-static, (ii) the evaluation criteria associated with the single-dynamic, (iii) the occurrence frequency of the NS, and (iv) the ratio of the PA to the FA.

The multi-dynamic is associated with, as evaluation criteria, the evaluation criteria associated by the single-dynamic, and with the occurrence frequency of the NS.

Then, according to the evaluation criteria associated with the saliency patterns, the user response analyzing unit 103 calculates an evaluating value (vector) E. The evaluating value E corresponds to a correlation between the saliency area and the eye gaze direction, and quantitatively indicates the degree of the correlation.

In the FA, (i) how often saccades occur within the target and (ii) what size are the saccades are estimated as indices for how actively the user scans the target.

In other words, when the saliency pattern is a static pattern (the single-static, the multi-static, or the multi-static/dynamic), the user response analyzing unit 103 calculates a correlation so that the correlation is higher as the saccades occur more frequently in the saliency area.

Such a feature allows the user response analyzing unit 103 to calculate a correlation based on how many saccades occur in the saliency area, when the saliency pattern is a static pattern. The saccades in a saliency area are eye gaze movements to obtain information from the saliency area. Hence the user response analyzing unit 103 calculates a correlation between the saliency area and the eye gaze direction so that the correlation is higher as more saccades occur within the saliency area. As a result, the user response analyzing unit 103 successfully estimates the degree of interest with higher accuracy.

Moreover, when the saliency pattern is a static pattern, the user response analyzing unit 103 calculates a correlation between the saliency area and the eye gaze direction so that the correlation is higher as an amount of change (stroke length of saccades) observed in the eye gaze direction and caused by saccades within the saliency area is greater. In such a case, the user response analyzing unit 103 preferably normalizes the amount of change of the eye gaze direction based on the size of the saliency area (area, for example).

Such a feature makes it possible to calculate a higher correlation when an eye gaze movement for obtaining information occurs in a large area in the saliency area. Hence the degree of interest estimating device 100 successfully estimates the degree of interest with higher accuracy.

In the PA, (iii) the speed difference between the target flow and the eye gaze movement is estimated as an index for how much the user synchronizes with and follows the target. In other words, when the saliency pattern is a dynamic pattern (the single-dynamic, the multi-dynamic, or the multi-static/dynamic), the user response analyzing unit 103 calculates a correlation so that the correlation is higher as the speed difference is smaller between the motion speed of a saliency area on the screen and the motion speed of a gaze position specified from the eye gaze direction and found on the screen. Here the user response analyzing unit 103 preferably normalizes the speed difference based on the motion speed of the saliency area.

Such a feature makes it possible to calculate a higher correlation when an eye gaze movement follows the movement of the saliency area for obtaining information from the saliency area. Hence the degree of interest estimating device 100 successfully estimates the degree of interest with higher accuracy.

When a saliency pattern includes multiple flows, the occurrence frequency of the NS is added as an evaluation criterion. In other words, when the saliency pattern includes multiple patterns (the multi-static, the multi-dynamic, or the multi-static/dynamic), the user response analyzing unit 103 calculates a correlation so that the correlation is higher as more saccades occur. Each of the saccades moves a gaze position from one saliency area to another saliency area. Here the user response analyzing unit 103 preferably normalizes the occurrence frequency of the saccades based on the number of saliency areas.

Such a feature makes it possible to calculate a higher correlation when eye gaze movements for obtaining information occur in more saliency areas. Hence the degree of interest estimating device 100 successfully estimates the degree of interest with higher accuracy.

In both the high degree of interest (H) and the low degree of interest (L), the distribution of evaluating values E for each of the saliency patterns is previously learned. Based on the result of the learning, the user response analyzing unit 103 can calculate, as posteriori probabilities $P(H|E^*)$ and $P(L|E^*)$, probabilities of the high degree of interest and the low degree of interest after a newly obtained evaluating value $E^*$. The user response analyzing unit 103 compares the posteriori probabilities $P(H|E^*)$ and $P(L|E^*)$ to estimate a degree of interest in the video.

As described above, the degree of interest estimating device according to the embodiment (i) obtains a saliency area which is likely to attract the user's visual attention from a video, and information on a saliency shift showing a temporal shift pattern of the saliency area, and (ii) estimates a degree of interest in the video based on a correlation between the saliency shift and a gaze response Consequently, the degree of interest estimating device successfully estimates the degree of interest in the video with high accuracy when the video is displayed on the screen.

In other words, the degree of interest estimating device according to the embodiment can estimate a degree of interest of the user in a video based on a correlation between a saliency area in the video and an eye gaze direction of the user. Specifically, the degree of interest estimating device can estimate the degree of interest with the characteristics of the video considered, which contributes to estimating the degree of interest with higher accuracy than when the degree of interest is estimated based only on the eye gaze direction. In particular, the degree of interest estimating device can take advantage of a higher correlation between a saliency area and an eye gaze direction as the degree of interest in the video is higher. Thus the degree of interest estimating device can estimate the degree of interest with higher accuracy.

Moreover, the degree of interest estimating device according to the embodiment can estimate a degree of interest of the user in the video without measuring an electrodermal activity of the user. Thus the degree of interest estimating device can estimate the degree of interest with simple operations, which frees the user from some troublesome tasks.

Furthermore, the degree of interest estimating device according to the embodiment can calculate the correlation between the saliency area and the eye gaze direction according to an evaluation criterion which suits a saliency pattern. Hence the degree of interest estimating device can estimate the degree of interest with higher accuracy.

It is noted that in the embodiment, the "interest" of the user in a video is defined to the effect that the user "pays attention" to the video. The "interest" in the present invention may also be referred to as "concentration". In other words, the present invention is also directed to the estimation of a concentration degree of the user in the video.

In the embodiment, the degree of interest estimating device 100 estimates a degree of interest. The term "estimate" may also be referred to as "calculate". In other words, the degree of interest estimating device estimating a degree of interest may also be referred to as a degree of interest calculating device calculating a degree of interest.

It is noted that the degree of interest estimated by the degree of interest estimating device 100 is used, for example, for appropriately displaying information for the user. When the degree of interest is low, for example, the screen displays on its center the information for the user. Hence the display device successfully reduces the risk of the user overlooking the displayed information. In contrast, when the degree of interest is high, the display device displays the information for the user on an end of the screen or does not display the information. Hence the display device successfully reduces an uncomfortable feeling of the user.

In addition, the brightness of the display device may be adjusted based on a degree of interest estimated by the degree of interest estimating device 100. When the degree of interest is low, for example, the brightness of the display device may be adjusted to be lower than that when the degree of interest is high. Such a feature can reduce the consumption power of the display device, contributing to energy consumption.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

In the embodiment, for example, the user response analyzing unit 103 calculates a correlation between a saliency area and an eye gaze direction based on a saliency pattern; instead, the calculation does not necessarily have to be based on the saliency pattern. For example, regardless of the saliency pattern, the user response analyzing unit 103 may calculate a correlation between a saliency area and an eye gaze direction based on the occurrence frequency of saccades in the saliency area. Specifically, the degree of interest estimating device 100 can estimate the degree of interest with consideration of the characteristics of the video, which contributes to estimating the degree of interest with higher accuracy than when the degree of interest is estimated based only on the eye gaze direction.

Moreover, in the embodiment, multiple saliency patterns are classified based on the number and the motion of the saliency areas; instead, the saliency patterns may be classified based only one of the number and the motion of the saliency areas. In other words, the saliency patterns may be classified based on at least one of the number and the motion of the saliency areas.

Furthermore, the present invention may be modified as described below.

(1) Specifically, the degree of interest estimating device is a computer system including a micro processor, a Read Only Memory (ROM), a Random Access Memory (RAM), a hard-disk unit, a display unit, a keyboard, a mouse, and the like. The ROM or the hard-disk unit stores a computer program. The degree of interest estimating device achieves its functions through the microprocessor's operation according to the computer program. Here, the computer program includes a combination of multiple instruction codes sending an instruction to the computer in order to achieve a predetermined function. It is noted that the degree of interest estimating device shall not be limited to a computer system including all of a microprocessor, a ROM, a RAM, a hard-disk unit, a display unit, a keyboard, and a mouse, but may be a computer system including some of them.

(2) Some or all of the structural elements included in the degree of interest estimating device may be included in a single system Large Scale Integration (LSI). A system LSI is an ultra-multifunction LSI manufactured with plural structural units integrated on a single chip. Specifically, the system LSI is a computer system having a micro processor, a ROM, a RAM, and the like. The ROM stores a computer program. The system LSI achieves its functions through the microprocessor's operation according to the computer program.

The system LSI introduced here may be referred to as an Integrated circuit (IC), an LSI, a super LSI, an ultra LSI, depending on integration density. Moreover, a technique of integrating into a circuit shall not be limited to the form of an LSI; instead, integration may be achieved in the form of a designated circuit or a general purpose processor. Employed as well may be the following: a Field Programmable Gate Array (FPGA) which is programmable after manufacturing of the LSI; or a reconfigurable processor which makes possible reconfiguring connections and configurations of circuit cells within the LSI.

Furthermore, if an integrated circuit technology that replaces the LSI appears thorough the progress in the semiconductor technology or another derived technology, that technology can naturally be used to carry out integration of the constituent elements. Biotechnology can be applied to the integrated circuit technology.

(3) Some or all of the constituent elements constituting the degree of interest estimating device may be configured as an IC card which can be attached and detached from each apparatus or as a stand-alone module. The IC card or the module is a computer system which consists of a micro processor, a ROM, a RAM, and the like. The IC card and the module may also include the ultra-multifunction LSI. The IC card or the module achieves its function through the microprocessor's operation according to the computer program. The IC card or the module may also be implemented to be tamper-resistant.

(4) The present invention may be implemented in the form of a method including operations of characteristic structural units, which the degree of interest estimating device has, as steps. The method may be achieved in a form of a computer program executed on a computer or digital signals including the computer program.

Furthermore, the present invention may also be implemented by storing the computer program or the digital signal in a non-transitory computer-readable recording medium such as a flexible disc, a hard disk, a CD-ROM, an MO, a DVD, a DVD-ROM, a DVD-RAM, a BD (Blu-ray Disc®), and semiconductor memory. The present invention may also be the computer program or the digital signals recorded in the recording media.

The present invention may further transmit the computer program or the digital signals via a network and data broadcast mainly including an electronic communications line, a wireless or a wired communications line and the Internet.

The present invention may also be a computer system including a micro processor and a memory. The memory may store the computer program described above, and the micro processor may operate according to the computer program.

The present invention can be implemented by another independent computer system by storing and transferring the program or the digital signals in a recording medium or via a network.

(5) The present invention may be a combination of the above embodiment with any of the above variations.

INDUSTRIAL APPLICABILITY

The present invention is applicable to a degree of interest estimating device which estimates a degree of interest of a user in a displayed video. For example, the present invention is applicable to a user interface device and a video display device.

REFERENCE SIGNS LIST

100 Degree of interest estimating device
101 Eye gaze detecting unit
102 Saliency information obtaining unit
103 User response analyzing unit

The invention claimed is:

1. A degree of interest estimating device which estimates a degree of interest of a user in a video displayed on a screen, the degree of interest estimating device comprising:
a processor; and
a non-transitory memory having stored thereon executable instructions, which when executed, cause the processor to perform:
detecting an eye gaze direction of the user;
obtaining saliency information on a saliency area having salient attractiveness in the video;
calculating a correlation between the saliency area specified from the obtained saliency information and the detected eye gaze direction; and
estimating the degree of interest of the user in the video, the degree of interest being higher as the calculated correlation is higher,
wherein the obtaining the saliency information includes (i) determining saliency patterns based on a number of saliency areas in the video and a motion of one or more saliency areas including the saliency area, in each of a plurality of frames of the video, the saliency patterns classifying the one or more saliency areas as one of (a) a dynamic pattern indicating that the one or more saliency areas temporally change in position and (b) a static pattern indicating that the one or more saliency areas do not temporally change in position, (ii) temporally segmenting the video into video sequences based on the determined saliency patterns, and (iii) obtaining, as the saliency information, the saliency patterns corresponding to the video sequences,
the calculating the correlation includes calculating, for each video sequence of the video sequences, the correlation using at least one of an evaluation criteria associated with the saliency pattern corresponding to the video sequence, such that the degree of interest of the user in the video is estimated with high accuracy, and
the calculating the correlation includes calculating, as a value showing how low the correlation is, a speed difference between a moving speed of the saliency area on the screen and a moving speed of a gaze position on the screen specified from the eye gaze direction, and in the estimating the degree of interest, the degree of interest is estimated so that the degree of interest is higher as the speed difference is smaller.

2. The degree of interest estimating device according to claim 1, wherein the static pattern is associated with, as the at least one of the evaluation criteria, occurrence frequency of saccades in the saliency area, and the calculating the correlation includes calculating, when the saliency pattern corresponding to the video sequence is the static pattern, the correlation so that the correlation is higher as the occurrence frequency of the saccades, specified from the detected eye gaze direction and found in the saliency area, is higher.

3. The degree of interest estimating device according to claim 1, wherein the obtaining the saliency information includes obtaining the saliency information from a tag attached to a signal showing the video.

4. The degree of interest estimating device according to claim 1, wherein the obtaining the saliency information includes obtaining the saliency information by analyzing the video based on physical characteristics of an image.

5. The degree of interest estimating device according to claim 1, wherein the saliency area is an area for an object which relates to audio information that comes with the video.

6. The degree of interest estimating device according to claim 5, wherein the object is a face or a mouth of a speaker.

7. The degree of interest estimating device according to claim 5, wherein the saliency area is an area that shows a text message corresponding to the audio information.

8. The degree of interest estimating device according to claim 1, wherein the saliency area is an area of a moving object.

9. The degree of interest estimating device according to claim 8, wherein the moving object is a person.

10. The degree of interest estimating device according to claim 8, wherein the moving object is an animal.

11. The degree of interest estimating device according to claim 1, wherein the correlation is a degree of temporal synchronization between the saliency area and the detected eye gaze direction.

12. The degree of interest estimating device according to claim 1, wherein in the correlation is a degree of spatial similarity between the saliency area and the detected eye gaze direction.

13. The degree of interest estimating device according to claim 1, wherein the calculating the correlation includes calculating, as a value showing how low the correlation is, a time difference between a time when the saliency area appears and a time when a saccade of an eye gaze for the saliency area occurs, and
in the estimating the degree of interest, the degree of interest is estimated so that the degree of interest is higher as the time difference is smaller.

14. The degree of interest estimating device according to claim 1, wherein the calculating the correlation includes calculating, as a value showing how low the correlation is, a time difference between a time when the saliency area moves on the screen at a predetermined speed or faster and a time when a saccade of an eye gaze at the saliency area occurs, and
in the estimating the degree of interest, the degree of interest is estimated so that the degree of interest is higher as the time difference is smaller.

15. The degree of interest estimating device according to claim 1, wherein the calculating the correlation includes calculating the correlation based on the number of saliency areas in the video, an area of each of the saliency areas, and occurrence frequency of saccades of an eye gaze.

16. The degree of interest estimating device according to claim 1, wherein the processor and the non-transitory memory are included in an integrated circuit.

17. The degree of interest estimating device according to claim 1, wherein the obtaining the saliency information includes; obtaining at least one saliency flow included in the video, the at least one saliency flow being a spatiotemporal volume of the saliency area in the video; temporally segmenting the at least one saliency flow into state sequences including a dynamic state where a position of the saliency area changes temporally and a static state where the position of the saliency area does not change temporally; and specifying, for each of frames included in the one of the saliency patterns corresponding to the state sequences of the at least one saliency flow for the frame, thereby temporally segmenting the video into the video sequences.

18. The degree of interest estimating device according to claim 1, wherein the obtaining the saliency information includes: obtaining at least one saliency flow included in the video, the at least one saliency flow being a spatiotemporal volume of the saliency area in the video; and specifying, for each of frames included in the video, one of the saliency patterns corresponding to a number of the at least one saliency flow for the frame, thereby temporally segmenting the video into the video sequences.

19. A degree of interest estimating method for estimating a degree of interest of a user in a video displayed on a screen, the degree of interest estimating method comprising:
   detecting, using a processor, an eye gaze direction of the user;
   obtaining, using the processor, saliency information on a saliency area having salient attractiveness in the video;
   calculating, using the processor, a correlation between the saliency area specified from the obtained saliency information and the detected eye gaze direction; and
   estimating, using the processor, the degree of interest of the user in the video, the degree of interest being higher as the calculated correlation is higher,
   wherein the obtaining the saliency information includes (i) determining saliency patterns based on a number of saliency areas in the video and a motion of one or more saliency areas including the saliency area, in each of a plurality of frames of the video, the saliency patterns classifying the one or more saliency areas as one of (a) a dynamic pattern indicating that the one or more saliency areas temporally change in position and (b) a static pattern indicating that the one or more saliency areas do not temporally change in position, (ii) temporally segmenting the video into video sequences based on the determined saliency patterns, and (iii) obtaining, as the saliency information, the saliency patterns corresponding to the video sequences,
   the calculating the correlation includes calculating, for each video sequence of the video sequences, the correlation using at least one of an evaluation criteria associated with the saliency pattern corresponding to the video sequence, such that the degree of interest of the user in the video is estimated with high accuracy, and
   the calculating the correlation includes calculating, as a value showing how low the correlation is, a speed difference between a moving speed of the saliency area on the screen and a moving speed of a gaze position on the screen specified from the eye gaze direction, and
   in the estimating the degree of interest, the degree of interest is estimated so that the degree of interest is higher as the speed difference is smaller.

20. A non-transitory computer-readable recording medium for use in a computer, the non-transitory computer-readable recording medium having a computer program recorded thereon for causing the computer to execute the degree of interest estimating method according to claim 19.

* * * * *